United States Patent Office

CHARLES W. SIEMENS, OF WESTMINSTER, ENGLAND.

IMPROVEMENT IN LININGS FOR ROTATIVE FURNACES.

Specification forming part of Letters Patent No. 213,353, dated March 18, 1879; application filed July 13, 1878.

*To all whom it may concern:*

Be it known that I, CHARLES WILLIAM SIEMENS, of Westminster, in the county of Middlesex, England, have invented an Improved Lining for Rotative Furnaces; and I do hereby declare that the following is a full, clear, and exact description thereof, that will enable others skilled in the art to which it appertains to make and use the same.

My invention relates to that class of rotative regenerative furnaces for which Letters Patent of the United States were granted to me on the 9th day of February, A. D. 1875; and the nature thereof consists in the method hereinafter described of forming an oxide lining within the rotative chamber by allowing the second or welding cinder to remain after the balls have been removed, and by consolidating it by cooling and the admixture of pure oxides.

In making the lining of the rotative chamber, scale or other oxides of iron, as also oxides of manganese, chromium or titanium, may be used together or separately, or in combination with a rich cinder, such as that obtained from reheating and puddling furnaces. A rich aluminous cinder is also very useful for admixture in certain cases.

In using an oxide lining I operate as follows: On the rotative casing, protected by brick-work or otherwise, an initial lining of oxide of iron is first melted and set around to the depth of a few inches; then a charge of oxide and rich cinder, mixed, is melted and set round. On this bed an ordinary charge of ores, fluxes, &c., is worked. When the charge has come to the metallic condition, and the iron is partly aggregated, the fluid scoria is tapped off in the usual manner; the heat is then raised, the balls are formed, and at the same time a second cinder appears, derived partly from the balls and partly from the lining. This under proper management should be a true welding-cinder of the approximate formula $2F_2O, S_2O_2$. After the balls are taken out this cinder is not tapped off, but is enriched by the addition of some of the above-mentioned oxides. Some of it is then splashed onto the furnace ends, and the remainder is allowed to set, so as to form a new working-face for the lining. In order to cool the furnace for this purpose the admission of air and gas is stopped or greatly diminished, and water is projected onto the casing in jets from perforated tubes placed above and below on the outside of the rotative chamber. If the lining is to be increased all around, the chamber is allowed to rotate slowly while the cooling takes place; but if it be desirable to form a flat side to the lining to prevent the sliding of subsequent charges, the rotation is stopped, and, after enriching the cinder with scale or other oxides, lumps of titanium or chrome ores, or of other refractory materials, such, for example, as large pieces of rich calcined iron-stone, or lumps of hematite or magnetic iron ore, which, by preference, have been previously warmed to avoid decrepitation, are thrown into the bath and well coated with cinder. The water is then turned onto the bottom of the rotative chamber, and the flat is quickly solidified. The lumps set in give a rough surface, and not only materially assist in preventing the charge from sliding, but also help to keep it continually turning over and exposing fresh surfaces to the action of the flame. In this way each charge contributes to the lining for the subsequent one, and loss of iron is avoided.

Having thus described my invention, I claim and desire to secure by Letters Patent of the United States—

The process hereinbefore set forth of forming an oxide lining within the rotative chamber by allowing the second or welding cinder to remain after the balls have been removed, and then consolidating it by cooling, and finally admixing therewith pure oxides in lumps, substantially as herein described.

C. WILLIAM SIEMENS.

Witnesses:
 CHAS. ROCHE,
 A. Q. WALSH.